United States Patent [19]

Sarin et al.

[11] Patent Number: 4,469,489
[45] Date of Patent: Sep. 4, 1984

[54] COATED COMPOSITE MODIFIED SILICON ALUMINUM OXYNITRIDE CUTTING TOOLS

[75] Inventors: Vinod K. Sarin, Lexington; Sergej-Tomislav Buljan, Acton, both of Mass.

[73] Assignee: GTE Laboratories Incorporated, Waltham, Mass.

[21] Appl. No.: 536,111

[22] Filed: Sep. 26, 1983

[51] Int. Cl.$^3$ .................... B24B 1/00; B24D 11/00
[52] U.S. Cl. ...................... 51/295; 51/293; 51/307; 51/309; 427/249; 428/698
[58] Field of Search .............. 51/293, 295, 307, 309; 427/215, 249; 428/698

[56] References Cited

U.S. PATENT DOCUMENTS

| | | | |
|---|---|---|---|
| 4,179,301 | 12/1979 | Buljan | 501/154 |
| 4,406,669 | 9/1983 | Sarin et al. | 51/295 |
| 4,406,670 | 9/1983 | Sarin et al. | 51/295 |

Primary Examiner—Donald E. Czaja
Assistant Examiner—W. Thompson
Attorney, Agent, or Firm—Ivan L. Ericson

[57] ABSTRACT

Coated wear resistant composite ceramic cutting tools comprise a composite substrate body consisting essentially of a particulate material selected from the group consisting of the refractory metal carbides, nitrides, carbonitrides and combinations thereof uniformly distributed in a matrix, coated with at least one intermediate adherent coating layer of a refractory material and an outer adherent coating layer. The intermediate adherent coating layer has a different chemical composition than the outer adherent coating layer. The particulate material is of an average particle size ranging between about 0.5 microns to about 20 microns and comprises from about 5 to about 60 volume percent of the composite cutting tool. The matrix consists essentially of a modified silicon aluminum oxynitride having about 2 to about 25 volume percent of a modifier selected from the oxides of silicon, yttrium, magnesium, hafnium, zirconium, beryllium, the lanthanides and combinations thereof.

9 Claims, No Drawings

COATED COMPOSITE MODIFIED SILICON ALUMINUM OXYNITRIDE CUTTING TOOLS

CROSS-REFERENCE TO RELATED APPLICATIONS

This application contains subject matter related to matter disclosed and claimed in copending patent application Ser. No. 128,070 filed Mar. 7, 1980, now abandoned entitled "Abrasion Resistant Silicon Nitride Based Articles" and in the following copending applications filed concurrently herewith, all assigned to the assignee of the present application:

Application Ser. No. 380,364, now U.S. Pat. No. 4,425,141 entitled "Composite Ceramic Cutting Tool";

Application Ser. No. 380,361, now U.S. Pat. No. 4,421,528 entitled "Process for Making a Modified Silicon Aluminum Oxynitride Based Composite Cutting Tool";

Application Ser. No. 380,384 now U.S. Pat. No. 4,431,431 entitled "Carbide Coated Silicon Nitride Cutting Tools";

Application Ser. No. 380,363 entitled "Alumina Coated Silicon Nitride Cutting Tools";

Application Ser. No. 380,381 now U.S. Pat. No. 4,409,003 entitled "Carbonitride Coated Silicon Nitride Cutting Tools";

Application Ser. No. 380,383 now U.S. Pat. No. 4,406,668 entitled "Nitride Coated Silicon Nitride Cutting Tools";

Application Ser. No. 380,362 now U.S. Pat. No. 4,416,670 entitled "Carbide Coated Composite Silicon Nitride Cutting Tools";

Application Ser. No. 380,379 now U.S. Pat. No. 4,421,525 entitled "Alumina Coated Composite Silicon Nitride Cutting Tools";

Application Ser. No. 380,382 now U.S. Pat. No. 4,409,004 entitled "Carbonitride Coated Composite Silicon Nitride Cutting Tools";

Application Ser. No. 380,380 now U.S. Pat. No. 4,406,667 entitled "Nitride Coated Composite Silicon Nitride Cutting Tools";

Application Ser. No. 380,387 now U.S. Pat. No. 4,426,209 entitled "Carbide Coated Composite Modified Silicon Aluminum Oxynitride Cutting Tools";

Application Ser. No. 380,388, now U.S. Pat. No. 4,424,066 entitled "Alumina Coated Composite Modified Silicon Aluminum Oxynitride Cutting Tools";

Application Ser. No. 380,389, now U.S. Pat. No. 4,406,669 entitled "Carbonitride Coated Composite Modified Silicon Aluminum Oxynitride Cutting Tools";

Application Ser. No. 380,452, now U.S. Pat. No. 4,406,670 entitled "Nitride Coated Composite Modified Silicon Aluminum Oxynitride Cutting Tools";

Application Ser. No. 536,110, entitled "Carbide Coated Composite Silicon Nitride Cutting Tools";

Application Ser. No. 536,109, entitled "Carbide Coated Silicon Nitride Cutting Tools".

FIELD OF THE INVENTION

This invention relates to composite ceramic cutting tools and cutting tool inserts. More particularly, it is concerned with a cutting tool fabricated of a modified silicon aluminum oxynitride containing one or more hard refractory materials and coated with adherent refractory materials.

BACKGROUND OF THE INVENTION

Cemented carbide materials are well known for their unique combination of properties of hardness, strength, and wear resistance and have accordingly found extensive use in mining tool bits, metal cutting and boring tools, metal drawing dies, wear resistant machine parts and the like. It is known that the wear resistance of cemented carbide materials may be enhanced by the application of thin coatings of a highly wear resistant material such as titanium carbide or aluminum oxide. These coated carbide materials are finding increased commercial utility for certain cutting tool and machining applications.

Economic pressures for higher productivity in machining applications are placing increasing demands upon the performance of cutting tool materials. To achieve high productivity in machining, a tool must be able to cut at high speeds. At cutting speeds exceed 1500 surface feet per minute (sfpm), the high temperature strength and chemical inertness of a cutting tool material become more and more important. The usefulness of cemented carbide cutting tool materials (the predominant material used in cutting tools today) has been extended to applications requiring cutting speeds of about 1500 sfpm by coating such tools with aluminum oxide. For cutting speeds in excess of 1500 sfpm, cemented carbide tools encounter problems associated with loss of strength. Tool nose deformation, which affects dimensional tolerance in the workpiece and contributes to shorter tool life, becomes a problem at high cutting speeds with cemented carbide tools.

Conventional ceramic cutting tools overcome many of these disadvantages but have some limitations relating to their lower impact strength and fracture toughness. This is especially true of many alumina-based conventional ceramic cutting tools. Silicon nitride-based ceramic cutting tools have significantly higher impact strength and fracture toughness, but can exhibit lower than desired chemical inertness when employed in cutting long-chipping metals such as steel.

U.S. Pat. No. 4,252,768 to Perkins, et al. discloses abrasion resistant nozzles fabricated by distributing hard refractory metal carbides in a binary solid solution of a ceramic oxide and silicon nitride, preferably a ternary solid solution of a ceramic oxide, silicon nitride and aluminum nitride.

U.S.S.R. Pat. No. 537,986 to Gnesin discloses a ceramic material containing silicon nitride, metal carbide, and magnesium oxide or aluminum oxide, being exceptional in a way that, in order to increase the hardness and wear resistance, it contains, as a form of metal carbide, titanium carbide.

A wide variety of silicon nitride based materials containing aluminum oxide and other additional oxides constitute a group of modified silicon aluminum oxynitrides. These materials have relatively low hardness which limits their usefulness as cutting tool materials.

OBJECTS OF THE INVENTION

It is therefore an object of the present invention to provide improved cutting tools and cutting tool inserts.

It is another object of this invention to provide improved cutting tool inserts useful in the machining speed, temperature, or workpiece hardness.

It is another object of the present invention to provide an improved wear resistant composite ceramic cutting tool with improved performance in cutting long-chipping workpiece materials.

SUMMARY OF THE INVENTION

These and other objects, advantages, and capabilities are provided in accordance with one aspect of the present invention wherein an improved coated wear resistant composite ceramic cutting tool comprises a substrate body coated with one or more adherent intermediate coating layers of a refractory material and an outer adherent coating layer of a refractory material. The intermediate adherent coating layer has a different chemical composition than the outer adherent coating layer. The composite ceramic substrate consists essentially of a particulate material selected from the refractory metal carbides and/or nitrides and/or carbonitrides and/or mixtures thereof uniformly distributed in a matrix. The matrix comprises a modified silicon aluminum oxynitride. The particulate material comprises from about 5 to about 60 volume percent of the cutting tool and has an average particle size of between about 0.5 microns to about 20 microns. The modified silicon aluminum oxynitride has a modifier selected form the groups consisting of the oxides of silicon, yttrium, magnesium, hafnium, zirconium, beryllium, the lanthanides, and combinations thereof. The intermediate adherent coating layer and the outer adherent coating layer are selected from the group consisting of carbides, nitrides, carbonitrides of Ti, V, Cr, Zr, Nb, Mo, Hf, Ta, W and combinations thereof and alumina.

DETAILED DESCRIPTION

The polycrystalline substrate bodies of composite ceramic cutting tools and tool inserts described herein have a composite microstructure of a modified silicon aluminum oxynitride, and a dispersed phase of refractory metal carbide and/or nitride and/or carbonitride and/or solid solution thereof.

The modified silicon aluminum oxynitride is formed from about 2 to about 25 volume percent of a modifier, from about 20 to about 90 volume percent silicon nitride, and from about 5 to about 60 volume percent aluminum oxide.

Many combinations of compounds can be used to obtain the modified silicon aluminum oxynitride described. For example, silicon nitride (containing up to about 5 volume percent silicon dioxide) and alumina may be employed. In that case, the alumina content is preferably in the range from about 5 to about 60 volume percent, preferably from about 10 to about 30 volume percent.

The sintering additive or modifier is selected from the group consisting of the oxides of silicon, yttrium, hafnium, zirconium, beryllium, the lanthanides, and combinations thereof. The preferred metal oxide modifier is yttrium oxide. Silicon dioxide is a glass-forming modifier which can be present in the silicon nitride starting powder or it may be purposely introduced. Unintentional impurities present in the body tend to concentrate in the intergranular phase of the matrix and should be minimized. The modifier comprises from about 2 to about 25 volume percent, preferably from about 2 to about 10 volume percent of the matrix, defined as the modified silicon aluminum oxynitride.

In accordance with this invention, the refractory material comprises from about 5 to about 60 volume percent of the densified composite cutting tool, preferably from about 20 to about 40 volume percent. Typical hard refractory materials are the metal carbides and/or nitrides and/or carbonitrides and/or solid solutions thereof. Preferred hard refractory materials are the carbides, nitrides, carbonitrides and solid solutions thereof of metals selected from the group consisting of Ti, W, Hf, Nb, Ta, and V and combinations thereof. Particularly preferred hard refractory materials are TiC, TiN, HfC, HfN, Ti(C,N) and Hf(C,N).

The average particle size of the hard refractory material, determined by surface area measurement techniques (i.e. B.E.T.), ranges from about 0.5 microns to about 20 microns for cutting tool applications, preferably from about 0.5 microns to about 5 microns.

The hardness of the cutting tools of this invention increases with increasing hard refractory material content, but in order to optimize hardness together with fracture toughness, the preferred range of hard refractory material content is from about 20 to about 40 volume percent of the composite, with the most preferred range being about 30 volume percent. The resistance to chemical wear of these tools increases with increasing aluminum oxide content.

The cutting tools of this invention are made by compacting the above-mentioned components to a highly dense article by conventional techniques such as sintering, hot pressing, or hot isostatic pressing. Since the strength of the resulting cutting tools decreases with increasing porosity of the compact, it is important that the compact be densified to a density as closely approaching theoretical density as possible.

It has been found that mechanical mixing of the powdered components of the cutting tools of this invention results in smaller or larger inhomogeneities in the distribution of the modifying phase. These inhomogeneities may be of the order of 5 to 300 microns in size, resulting in undesired localized variation in properties of the matrix.

Homogeneity of the cutting tool material is an extremely important factor for tool performance. During cutting, only a small portion of the cutting tool is exposed to high stress and elevated temperatures. The temperature induced changes in mechanical properties, which are also compositionally dependent, contribute to fracture and chipping at the tool edge, in turn contributing to the rate of tool wear.

Modified silicon aluminum oxynitride based composite cutting tools of improved performance in accordance with this invention are obtained by pre-reacting a mixture of $Si_3N_4$, the metal oxide modifier, and from about 5 to 60 volume percent $Al_2O_3$ in a non-oxidizing atmosphere such at nitrogen, helium, or argon, at a temperature ranging from about 1400° C. to about 1800° C., preferably from about 1600° C. to about 1800° C. for a period of from about 1 hour to about 8 hours. The pre-reacted material is mixed with from about 5 to 50 volume percent of a hard refractory material selected from the carbides, nitrides, carbonitrides, and mixtures thereof of the refractory metals. The resulting mixture is comminuted by ball milling, high energy air milling, or attrition ball milling to form the initial composite blend. The composite blend is then densified to a density of at least 98% of theoretical by pressing followed by sintering, hot-pressing, gas over-pressure sintering, or hot isostatic pressing in a non-oxidizing atmosphere. Temperatures employed for pressing followed by sintering range from about 1600° C. to about 1800° C., preferably from about 1700° C. to about 1800° C. Hot-pressing is carried out at pressures greater than about 2000 psig (13,790 kN/M$^2$) at temperatures ranging from about 1600° C. to about 1900° C., preferably from about 1700° C. to about 1900° C. Gas over-pressure sintering is carried out at pressures from about 150 to about 200 psig (about 1030 to about 1380 kN/M$^2$) and at temperatures ranging from about 1600° C. to about 1950° C., preferably from about 1700° C. to about 1950° C. Hot isostatic pressing is carried out at pressures ranging above 10,000 psig (68,947 kN/M$^2$) and at temperatures ranging from about 1600° C. to about 1900° C., preferably from about 1700° C. to about 1800° C.

The above-defined process steps improve the performance of the cutting tool because the process insures improved homogeneity of the matrix phase and uniform distribution of the hard refractory material throughout the cutting tool.

In order to fully utilize the advantages of the distributed hard refractory phase and to obtain a composite cutting tool with optimized chemical and mechanical wear resistance properties, it is preferred that the average particle size of the hard refractory material range between about 0.5 microns and about 20 microns in size, preferably between about 0.5 microns to about 5 microns.

Properties of the particulate composite cutting tool of this invention are tailored for particular applications through structural modification of the composite by control of the particle size, distribution, and concentration of the hard refractory particulate. It has been observed, for example, that the presence of coarse particles having a size greater than about 20 microns greatly increases the probability of tool chipping and catastrophic tool failure during machining. Large particles of the hard refractory material were always noted at the point of fracture origin in photomicrographs of fracture surfaces. It was also noted that room temperature and elevated temperature strengths decrease with increasing particle size of the hard refractory, although there was an improvement in fracture toughness.

Finer dispersion of the hard refractory material in the composite also improves chemical homogeneity of the cutting tool. In machining applications where chemical interaction takes place predominantly between the matrix and the workpiece material, improved chemical homogeneity of the composite decreases wear while insuring that any wear of the cutting tool is uniform.

To tailor the chemical composition of the composite tool of this invention for specific applications, the dispersed phase may be varied for certain machining conditions. Titanium carbide, hafnium carbide, titanium nitride, hafnium nitride, titanium carbonitride, and hafnium carbonitride are preferred hard refractory materials for inclusion in composite cutting tools of this invention. In those applications where it is important to minimize chemical wear, titanium nitride is preferred to titanium carbide. Additionally, titanium nitride exhibits better resistance to oxidation than titanium carbide in composite cutting tools of the invention. Combinations of titanium carbide and titanium nitride or titanium carbonitride itself have been found to be preferable under certain machining conditions to optimize mechanical and overall machining properties.

The following examples illustrating methods of preparing the composite ceramic substrate bodies of tools in accordance with this invention are provided to enable one skilled in the art to practice the invention. These examples, however are to be viewed merely as illustrative of the present invention and should not be viewed as limiting the scope of the invention as defined by the appended claims.

EXAMPLE 1

To 41.7 weight percent silicon nitride powder were added 32.85 weight percent alumina powder, 4.02 weight percent yttria powder, and 21.43 weight percent titanium carbide powder. About 2.5 parts by weight toluene, 0.1 parts by weight methanol, and 0.05 parts by weight stearic acid were added to the powder mixture. The resulting slurry was thoroughly mixed by ball milling and then dried at 75° C. The dry mixture was then ball milled for about 24 hours. The resulting mixture was mixed with about 0.05 parts by weight of a copolymer of ethylene glycol and methoxyethylene glycol, 1 part by weight toluene, and about 0.05 parts by weight methanol. This mixture was mixed by ball milling for about 15 minutes after which the slurry was dried at 75° C. and screened through a 60 mesh screen. The −60 mesh fraction was pressed at about 25,000 psig (172,370 kN/M$^2$) to obtain a green compact. The green compact was then sintered to a hard, densified product by heating to a temperature of 1750° C. in argon for 1.5 hours.

EXAMPLE 2

The method of Example 2 was employed to produce a composite cutting tool substrate body by employing 23.60 weight percent titanium nitride as the hard refractory material in place of the titanium carbide of Example 2.

EXAMPLE 3

The method of Example 2 was employed to produce a composite cutting tool substrate body by employing 55.07 weight percent hafnium carbide as the hard refractory material in place of the titanium carbide of Example 2.

EXAMPLE 4

To 41.7 weight percent silicon nitride and about 32.85 weight percent alumina powder were added about 4.02 weight percent yttrium oxide powder. The resulting mixture was thoroughly mixed by ball milling and then prereacted by heating at about 1725° C. for a period of about 5 hours in a nitrogen atmosphere to produce prereacted modified silicon aluminum oxynitride. To 0.70 parts by volume of the prereacted powder mixture were added about 0.30 parts by volume of titanium carbide powder. To the resulting powder mixture were added about 2.5 parts by weight toluene, about 0.1 parts by weight methanol, and about 0.05 parts by weight stearic acid. The resulting slurry was thoroughly mixed by ball milling and then dried at 75° C. The resulting dry mixture was ball milled for about 24 hours to uniformly distribute the titanium carbide throughout the prereacted modified silicon aluminum oxynitride. The resulting blend was mixed with about 0.05 parts by weight of a copolymer of ethylene glycol and methoxyethylene glycol, about 1 part by weight of toluene, and about 0.05 parts by weight of methanol. The resulting slurry was mixed by ball milling for about 30 minutes, dired at 75° C., and then screened through a 60 mesh screen. The −60 mesh fraction was pressed at about 25,000 psig (172,370 kN/M$^2$) to obtain a green compact which was thereafter sintered to a hard, highly densified body by heating at 1750° C. in argon.

EXAMPLE 5

A hard, highly densified cutting tool substrate body was produced by the general method outlined in Example 4; however densification of the −60 mesh powder mixture was effected by pressing the powder at a pressure of about 3000 psig (20,680 kN/M$^2$) at a temperature of about 1700° C. in argon.

EXAMPLE 6

The method of Example 4 was employed to produce a composite cutting tool substrate body by employing titanium nitride in place of the titanium carbide of Example 4 and by carrying out the sintering step in nitrogen at a temperature of about 1750° C.

In accordance with the principles of the present invention, the substrate body is coated with at least one hard, adherent intermediate coating layer comprising a refractory metal carbide, nitride, carbonitride or alumina. Typical metals of the carbides, carbonitrides and nitrides include titanium, vanadium, chromium, zirconium, niobium, molybdenum, hafnium, tantalum, and tungsten. Preferred intermediate coatings in accordance with this invention are titanium carbide, carbonitride and nitride; hafnium carbides, carbonitride and nitride; and alumina. The outer adherent coating layer can be chosen from the materials listed for the intermediate adherent coating layer except the material of the intermediate coating layer must be different than the outer adherent coating layer.

The intermediate and outer coating layers are of a thickness ranging between about 0.1 microns to about 20 microns, preferably between about 1.0 and about 10 microns.

Coating Methods

The composite substrate body produced by the methods of the examples given above are coated with a refractory material by chemical vapor deposition techniques or physical vapor deposition techniques known in the art. For example, the preferred intermediate coatings of titanium nitride, titanium carbide, titanium carbonitride, hafnium nitride, hafnium carbide or hafnium carbonitride and alumina are applied by chemical vapor deposition. Other refractory materials are applied by chemical vapor deposition techniques where such techniques are applicable, or by physical vapor deposition techniques such as direct evaporation, sputtering, etc.

Useful characteristics of the chemical vapor deposition method are the purity of the deposited layer and the tendency for some diffusional interaction between the layer being deposited and the substrate during early stages of the deposition process which leads to good layer adherency.

As an example, titanium nitride intermediate coating layers and outer coating layers are formed on the composite modified silicon aluminum oxynitride substrates or on the intermediate coating layers of cutting tools of this invention by passing a gaseous mixture of titanium tetrachloride, a gaseous nitrogen source such as nitrogen or ammonia, and hydrogen over the substrate at a temperature of between about 800° C. and 1500° C., preferably at temperatures above about 1000° C. The reaction is described by the following equation; hydrogen is added to insure that the reaction takes place in a reducing environment:

$$2TiCl_4 + N_2 + 4H_2 = 2TiN + 8HCl$$

As another example, titanium carbide intermediate coating layers or outer coating layers are formed on the composite modified silicon aluminum oxynitride substrates or on the intermediate coating layers of cutting tools of this invention by passing a gaseous mixture of titanium tetrachloride, a gaseous carbon source such as methane, and hydrogen over the substrate at a temperature of between about 800° C. and 1500° C., preferably at temperatures above about 1000° C. The reaction is described by the following equation, although hydrogen is often added to insure that the reaction takes place in a reducing environment:

$$TiCl_4 + CH_4 = TiC + 4HCl$$

As another example, titanium carbonitride intermediate coating layers or outer coating layers are formed on the composite silicon nitride substrates or intermediate coating layers of cutting tools of this invention by the chemical vapor deposition technique of passing a gaseous mixture of titanium tetrachloride, a gaseous carbon source such as methane, a gaseous nitrogen source such as nitrogen or ammonia, and hydrogen over the substrate at a temperature of between about 800° C. and 1500° C., preferably at temperatures above about 1200° C. Dissociated ammonia may be substituted for a mixture of nitrogen and hydrogen gases. The reaction is described by the following equation, although hydrogen is often added to insure that the reaction takes place in a reducing environment:

$$TiCl_4 + CH_4 + N_2 = Ti(C_xN_y) + 4HCl$$

The mixture is passed over the heated substrate until the desired coating thickness is achieved. Routine experimentation is used to determine the rate of coating thickness growth at a particular gaseous flow rate and temperature.

Control of the amounts of methane and nitrogen in the gas mixture permit the formation of layers in which the ratio of x to y in the formula $Ti(C_xN_y)$ are varied. The preferred values of x and y range between about 0.5 to about 0.6 for x and from about 0.4 to about 0.5 for y resulting in a preferred range of x/y ratio of from about 1.0 to about 1.5. The most preferred ratio of x to y is about 1.22, corresponding to values for x and y of about 0.55 and about 0.45, respectively.

As another example, alumina intermediate coating layers or outer coating layers are formed on the composite silicon nitride substrates or intermediate coating layers of the cutting tools of this invention by chemical vapor deposition techniques or physical vapor deposition techniques known in the art. In one chemical vapor deposition technique, more fully described in U.S. Pat. No. 3,914,473, vaporized aluminum chloride or other halide of aluminum is passed over the heated coated substrate together with water vapor and hydrogen gas. Alternatively, the aluminum oxide is deposited by physical vapor deposition techniques such as direct evaporation or sputtering. The reaction for the chemical vapor deposition technique is described by the following equation, although hydrogen gas is often added to insure that the reaction takes place in a reducing atmosphere:

$$2AlCl_3 + 3H_2O = Al_2O_3 + 6HCl$$

The substrate or coated substrate piece or pieces are heated to a temperature between about 800° C. to about 1500° C. in a furnace equipped for gaseous flow. The aluminum chloride supply is pre-heated to vaporize the material, and the aluminum chloride vapor is passed through the furnace, together with the other gases. The gas mixture is passed over the heated substrate or coated substrate until the desired coating thickness is achieved. Routine experimentation is used to determine the rate of coating thickness growth at a particular gaseous flow rate and temperature.

In another, preferred method of coating the composite silicon nitride substrate bodies or the intermediate coatings with one or more adherent alumina coating layers, aluminum chloride is reacted with carbon dioxide in the presence of hydrogen gas according to the following equation:

$$2AlCl_3 + 3CO_2 + 3H_2 = Al_2O_3 + 3CO + 6HCl;$$

carbon monoxide is optionally added to the gas mixture passed over the heated substrate or coated substrate bodies in order to establish the desired equilibrium gas composition.

Depending on the machining application and the work piece material, the combination of various coatings as described above can be tailored to enhance the overall tool performance. This is achieved through the combinations which lead to improved adherence of the coatings to substrate and the coatings to coatings, and achieved by the improved structure/property of the coatings such as hardness, fracture toughness, impact resistance, chemical inertness, etc.

While there have been shown and described what are at present considered to be the preferred embodiments of the present invention, it will be obvious to those skilled in the art that various changes and modifications may be made therein without departing from the scope of the invention as defined by the appended claims.

What is claimed is:

1. A coated wear resistant composite ceramic cutting tool comprising a substrate body and at least one intermediate adherent refractory material coating layer and an outer adherent alumina coating layer; said substrate body consisting essentially of a particulate material selected from the group consisting of the refractory metal carbides, nitrides, carbonitrides and mixtures thereof uniformly distributed in a matrix comprising a modified silicon aluminum oxynitride, said particulate material comprising from about 5 volume percent to about 60 volume percent of said cutting tool and having an average particle size of between about 0.5 microns and about 20 microns; said modified silicon aluminum oxynitride having a modifier selected from the group consisting of the oxides of silicon, yttrium, magnesium, hafnium, zirconium, beryllium, the lanthanides and combinations thereof.

2. A coated wear resistant composited ceramic cutting tool in accordance with claim 1 wherein said intermediate adherent refractory coating layer is selected from the group consisting of titanium nitride, vanadium nitride, chromium nitride, zirconium nitride, niobium nitride, molybdenum nitride, hafnium nitride, tantalum nitride, and tungsten nitride.

3. A coated wear resistant composite ceramic cutting tool in accordance with claim 1 wherein said intermediate adherent refractory coating layer is selected from the group consisting of titanium carbide, vanadium carbide, chromium carbide, zirconium carbide, niobium carbide, molybdenum carbide, hafnium carbide, tantalum carbide, and tungsten carbide.

4. A coated wear resistant composite ceramic cutting tool in accordance with claim 1 wherein said intermediate adherent refractory coating layer is selected from the group consisting of titanium carbonitride, vanadium carbonitride, chromium carbonitride, zirconium carbonitride, niobium carbonitride, molybdenum carbonitride, hafnium carbonitride, tantalum carbonitride, and tungsten carbonitride.

5. A coated wear resistant composite ceramic cutting tool comprising a substrate body and at least one intermediate adherent refractory material coating layer and an outer adherent refractory material coating layer wherein said outer adherent refractory coating layer has a different chemical composition than the intermediate adherent refractory coating layer; said substrate body consisting essentially of a particulate material selected from the group consisting of the refractory metal carbides, nitrides, carbonitrides and mixtures thereof uniformly distributed in a matrix comprising a modified silicon aluminum oxynitride, said particulate material comprising from about 5 volume percent to about 60 volume percent of said cutting tool and having an average particle size of between about 0.5 microns and about 20 microns; said modified silicon aluminum oxynitride having a modifier selected from the group consisting of the oxides of silicon, yttrium, magnesium, hafnium, zirconium, beryllium, the lanthanides and combinations thereof; said intermediate adherent refractory material coating layer being selected from the group consisting of carbides, nitrides and carbonitrides of Ti, V, Cr, Zr, Nb, Mo, Hf, Ta, W and combinations thereof and alumina; and said outer adherent refractory material coating layer being selected from the group consisting of carbides, nitrides and carbonitrides of Ti, V, Cr, Zr, Nb, Mo, Hf, Ta, W and combinations thereof and alumina.

6. A coated wear resistant composite ceramic cutting tool in accordance with claim 1 wherein said intermediate adherent refractory coating layer is of a thickness between about 0.1 microns and 10 microns.

7. A coated wear resistant composite ceramic cutting tool in accordance with claim 5 wherein said intermediate adherent refractory coating is of a thickness between about 0.1 and about 10 microns.

8. A coated wear resistant composite ceramic cutting tool in accordance with claim 1 wherein said outer adherent coating layer is of a thickness between about 1.0 and about 10 microns.

9. A coated wear resistant composite ceramic cutting tool in accordance with claim 5 wherein said outer adherent coating layer is of a thickness between about 1.0 and about 10 microns.

* * * * *